No. 742,489. PATENTED OCT. 27, 1903.
J. W. PRIDMORE.
GRAIN DIVIDER.
APPLICATION FILED MAR. 1, 1902.
NO MODEL.
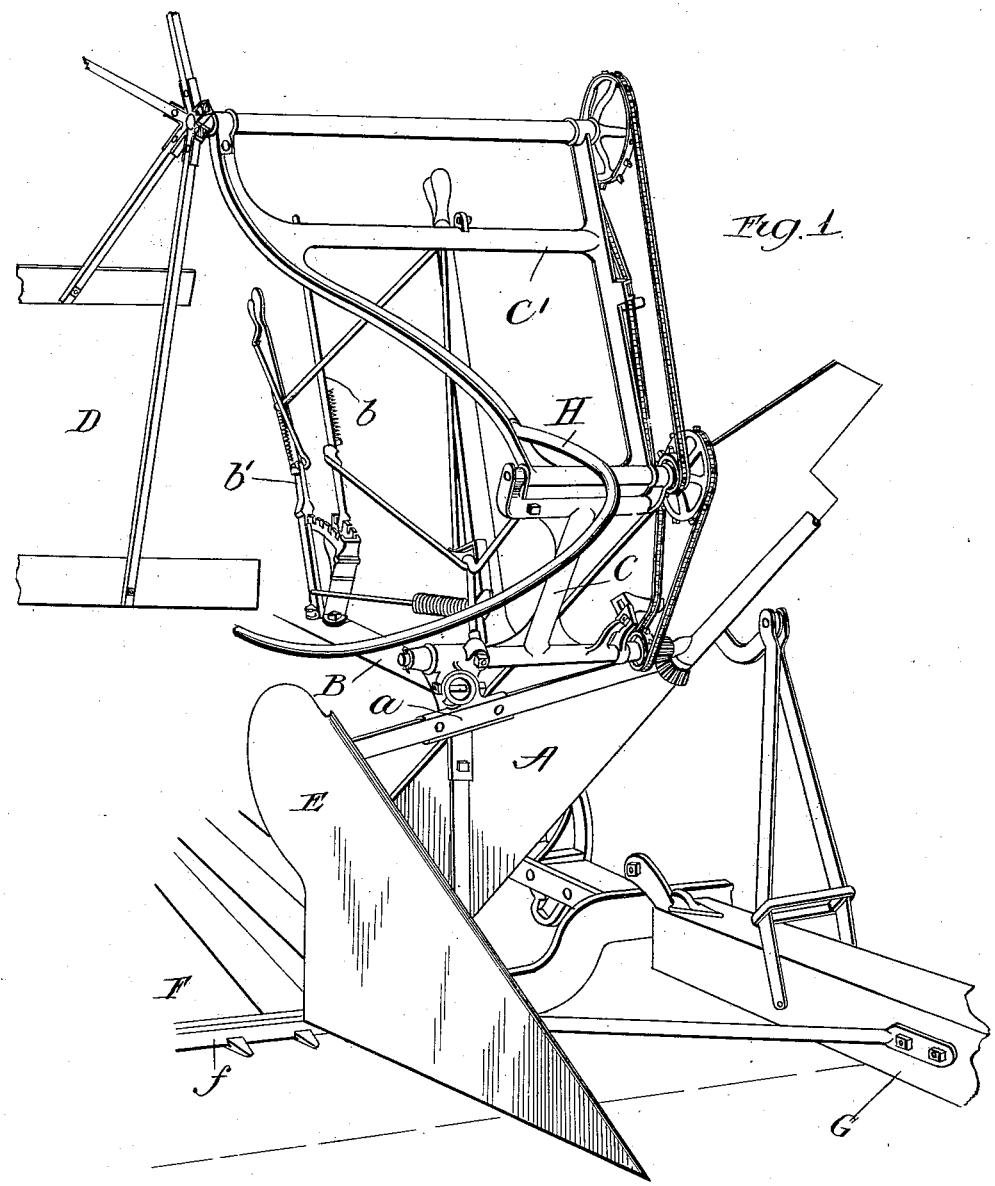

No. 742,489.

Patented October 27, 1903.

UNITED STATES PATENT OFFICE.

JOHN W. PRIDMORE, OF CHICAGO, ILLINOIS, ASSIGNOR TO McCORMICK HARVESTING MACHINE COMPANY, OF CHICAGO, ILLINOIS.

GRAIN-DIVIDER.

SPECIFICATION forming part of Letters Patent No. 742,489, dated October 27, 1903.

Application filed March 1, 1902. Serial No. 96,266. (No model.)

*To all whom it may concern:*

Be it known that I, JOHN W. PRIDMORE, a citizen of the United States, residing at Chicago, in the county of Cook and State of Illinois, have invented certain new and useful Improvements in Grain-Dividers, of which the following is a specification, reference being had to the accompanying drawings, forming a part thereof.

My invention relates to grain-dividers, and more especially to dividers which are adapted to be adjusted in conformity with the adjustment of the reel. It has for its object to provide adjustable means whereby the cut grain will be more positively divided and deflected, so that it may be engaged by the reel and placed upon the platform-carrier.

The difficulty is sometimes experienced in harvesting long grain, especially if it is down or tangled, of the grain hanging over the top of the divider out of the reach of the reel and being cut, either carried to the platform in a tangled condition by the incoming grain or strewn along the ground. I overcome these difficulties by securing to the reel-frame a finger or fender which shall extend a little inward from the ends of the reel-fans and just out of their path of revolution. This finger or fender is so shaped that it will clear the usual divider as the reel is adjusted. By this means the grain is deflected so as to be engaged by the reel whatever may be its adjustment.

In the drawings, Figure 1 is a perspective view of as much of a harvester of a well-known type as is necessary to show the application of the reel divider-finger. Fig. 2 is a perspective view of the reel divider-finger detached from the machine.

In Fig. 1, A represents the elevator frame-sheet, and $a$ a portion of the framework upon which the reel-frame is mounted in the usual manner.

B is a fragment of the seat-pipe, to which are secured in close proximity to the operator's seat the reel-adjusting levers $b$ and $b'$.

C is the lower member of the reel-frame, by which the reel is adjusted vertically by means of the lever $b$, and C' the upper member articulating therewith, by which it is adjusted laterally by the lever $b'$.

D represents a fragment of the reel, which is driven in the usual manner by suitable gearing.

E is the inside divider.

F is a fragment of the platform-carrier, $f$ the cutting apparatus, and G the draft-tongue.

Secured to the upper member C' of the reel-frame in any suitable manner is the reel divider-finger H. It extends forward and is curved inward and rearward to a point just outside the path of revolution of the reel-fans and inward toward the center from their ends. The distance that it extends forward is just sufficient for it to clear the inside divider when the reel is lowered to its lowest and rearmost position.

As herein shown and described the divider-finger is applied to the inner end of the reel; but it is evident that it might readily be applied to the outer end thereof without departing from the spirit of the invention. Also its inner or free end could be located within the path of revolution of the fans and, if desired, continued to the rear, curved outward, and secured again to the reel-frame. Hence I do not wish to be limited to the exact construction as herein shown.

Having thus described my invention, what I claim as new, and desire to secure by Letters Patent, is—

1. In a harvester, in combination with a reel, a divider mounted flexibly with relation to the platform and adjustable with the reel.

2. In a harvester, in combination with a reel, a divider mounted pivotally with relation to the platform and adjustable with the reel.

3. In a harvester, in combination with a reel, a divider mounted pivotally with relation to the platform and connected to and adjustable with the reel.

4. In a harvester, in combination with a reel, a reel-supporting frame and a divider-finger secured to said frame and adapted to be adjusted in conformity with the adjustment of the reel.

5. In a harvester, the combination of a relatively stationary divider, a reel, an adjustable reel-supporting frame and a divider-finger secured to said frame and adjustable with said reel, substantially as described.

6. In a harvester, the combination of a relatively stationary divider, a reel, an adjustable reel-supporting frame composed of two articulating members, means for adjusting each of said members, and a divider-finger secured to the upper member and extending to a point out of the path of revolution of the reel-fans and inward from their ends, substantially as described.

7. In a harvester, the combination of the relatively stationary divider E, the reel-supporting frame composed of the articulating members C and C', the adjustable reel D, the adjusting-levers $b$ and $b'$ connected to said articulating members C and C' respectively and the divider-finger H secured to the member C', substantially as described.

In testimony whereof I have affixed my signature to this specification in the presence of two subscribing witnesses.

JOHN W. PRIDMORE.

Witnesses:
CHAS. H. CHAMBERS,
E. EDWIN HAGEBRG.